3,113,424
TETRACYCLO-[3.3.1.0.$^{2,4}$0$^{6,8}$]-NONANE AS A NEW COMPOUND AND USE AS A HIGH ENERGY FUEL
Robert J. Wineman, Concord, Mass., assignor, by mesne assignments, to Monsanto Research Corporation, Everett, Mass., a corporation of Delaware
No Drawing. Filed Oct. 19, 1960, Ser. No. 63,472
6 Claims. (Cl. 60—35.4)

This invention relates to tetracyclic hydrocarbons. In one aspect, this invention relates to tetracyclo-[3.3.1.0.$^{2,4}$0$^{6,8}$]-nonane as a new compound. In another aspect, this invention relates to methods for preparing tetracyclo-[3.3.1.0.$^{2,4}$0$^{6,8}$]-nonane. In another aspect, this invention relates to high energy fuel compositions for use in reaction type power plants. In another aspect, this invention relates to improved methods of developing thrust. In another aspect, this invention relates to methods of operating reaction type power plants, such as jet-propulsion type engines, including rocket, ram-jet, pulse-jet, and turbo-jet engines, and turbine type engines, including turbo-prop and gas turbine engines.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet-propulsion type engine, such as a rocket, ram-jet, turbo-jet, or pulse-jet engine, exhaustion of the high temperature gases is directed in a rearward direction to produce a true jet propulsion. In a turbine type engine, such as a gas turbine or a turbo-prop engine, the exhaustion of high temperature gases is directed into a turbine which drives a propeller or other mechanical means for developing a forward thrust. Reaction type power plants may be used in widely different types of vehicles such as, in space-ships, aircraft, boats, guided missiles, automobiles, and the like.

Heretofore, it was believed that many hydrocarbons do not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as from 500° F. or higher but the presently available JP-4 fuel is thermally stable to a temperature of only about 400° F. Therefore, it is desirable to have a fuel which is thermally stable at a temperature of at least as high as 500° F.

Another serious disadvantage of the prior art fuels is the low heat of combustion of such fuels. Aircraft generally, and particularly military aircraft, are being designed for higher and higher speeds requiring higher energy level fuels. The fuel must not only have a high energy level on a weight basis, or high B.t.u./lb., but also a high energy level on a volume basis, or a high B.t.u./gals., since wing sections are being made thinner in order to reduce drag, and space for storage of fuel is limited. Thus, aircraft are often volume limited as well as weight limited for the storage of fuel. Aircraft are particularly volume limited using the currently available JP-6 high energy fuel which has a heat of combustion of 18,400 B.t.u./lb. on a weight basis but a heat of combustion of only 119,500 B.t.u./gal. on a volume basis. Therefore, it is desirable to provide a high energy fuel having a high heat of combustion on a volume basis, preferably greater than 120,000 B.t.u./gal., and at the same time obtain the other characteristics necessary for a good fuel of this type.

An object of this invention is to provide tetracyclo-[3.3.1.0.$^{2,4}$0$^{6,8}$]-nonane as a new compound.

Another object of this invention is to provide methods for preparing tetracyclo-[3.3.1.0.$^{2,4}$0$^{6,8}$]-nonane.

Another object of this invention is to provide high energy fuel compositions for use in reaction type power plants.

Another object of this invention is to provide improved methods of developing thrust.

Another object of this invention is to provide improved methods of operating reaction type power plants, particularly jet-propulsion type engines, including rocket, ram-jet, turbo-jet, and pulse-jet engines, and turbine type engines including turbo-prop and gas turbine engines.

Other aspects, objects and advantages of this invention will be apparent from a consideration of the accompanying disclosure and the appended claims.

According to the persent invention, there is provided, as a new compound, tetracyclo-[3.3.1.0.$^{2,4}$0$^{6,8}$]-nonane.

Also, according to the present invention, there are provided methods for producing tetracyclo-[3.3.1.0.$^{2,4}$0$^{6,8}$]-nonane by reaction of bicyclo-[2.2.1]-heptadiene-2,5 with methylene iodide in the presence of a zinc-copper couple.

Also, according to the present invention, there are provided high energy fuel compositions comprising, as an essential ingredient, tetracyclo-[3.3.1.0.$^{2,4}$0$^{6,8}$]-nonane.

Also, according to the present invention, there are provided improved methods of developing thrust, said method comprising oxidizing a high energy fuel composition comprising as an essential ingredient tetracyclo-[3.3.1.0.$^{2,4}$0$^{6,8}$]-nonane with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, tetracyclo-[3.3.1.0.$^{2,4}$0$^{6,8}$]-nonane into the combustion chamber of said reaction type power plant in such proportion as to produce a combustible mixture, subjecting said combustible mixture to combustion, and exhausting the resulting gases from said combustion chamber so as to impart thrust thereto.

The tetracyclo-[3.3.1.0.$^{2,4}$0$^{6,8}$]-nonane of the present invention can be illustrated by the following structural formula:

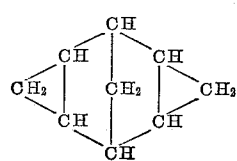

This hydrocarbon is produced by reacting bicyclo-[2.2.1]-heptadiene-2,5 having the formula:

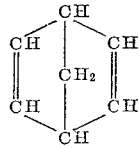

with 2 moles of a carbene, i.e., a divalent carbon intermediate which is preferably generated from methylene iodide and a zinc-copper couple.

The zinc-copper couple is prepared by heating a mixture containing from 75% to 95% zinc and, correspondingly, from 25% to 5% copper in a hydrogen atmosphere at a temperature in the range of from 425° C. to 475° C. for a period of time of from 4 to 6 hours. In the formation of the zinc-copper couple, the first part of the reaction is highly exothermic and care must be taken to avoid heating the mixture much above the temperature of 465° C. For general reactions of the carbenes, see, e.g., the papers by W. von E. Dvering et al., J. Amer. Chem. Soc. 76, 6162 (1954), and W. Kirmse, Angew. Chem. 71, 537 (1959).

Preparation of the carbene is carried out in an inert solvent medium, such as, for example, anhydrous diethyl ether, ethyl acetate, ethylene glycol, dimethyl ether, tetrahydrofuran and the like. Diethyl ether and tetrahydrofuran are preferred. The reaction is conveniently started in the presence of a small amount of iodine; however, the reaction can be conducted without the presence of this activation iodine. The reaction is initially conducted at substantially room temperature, and is continued at reflux temperature for a period of 24 to 60 hours. This reaction is preferably carried out at atmospheric pressure although subatmospheric and superatmospheric pressures can also be used.

The advantages, desirability, and usefulness of this invention are illustrated by the following examples.

EXAMPLE 1

A zinc-copper couple was prepared from a mixture of 120 g. of zinc dust and 15 g. of cupric oxide. This admixture was placed in an 8-inch Vycor boat in a ceramic combustion tube and heated in a stream of hydrogen to a temperature about 150° C. over a period of about 90 to 100 minutes. The temperature of the mixture was carefully determined using three iron-constantan thermocouples inserted into the reaction mixture. The reaction was found to be exothermic and required very careful heating in order to prevent the temperature from going above 475° C. The contents of the Vycor boat were held at a temperature of 425° C. to 450° C. for an additional period of approximately 4 hours in the hydrogen atmosphere. At the end of this time, the mixture was permitted to cool in the hydrogen atmosphere to obtain the zinc-copper couple as a grayish product.

Preparation of tetracyclo-[3.3.1.0.$^{2,4}$0$^{6,8}$]-nonane was conducted in a 5-liter round-bottomed flask into which was placed 398 g. (5.5 g.-atoms of zinc) of the zinc-copper couple, 2942 ml. of anhydrous diethyl ether which had been dried overnight over sodium, and 91.4 g. (0.36 mole) of iodine crystals. Upon the addition of the iodine crystals, a brief exothermic reaction occurred and after this reaction had subsided with the disappearance of the iodine color, 184 g. (2.0 moles) of bicyclo-[2.2.1]-heptadiene-2,5 and 1672 g. (5.5 moles) of redistilled methylene iodide were added together. The resulting mixture was then refluxed for a period of 48 hours, but after 24 hours, some precipitation of metallic copper was visually evident. At the end of the 48-hour period, the reaction mixture was treated with a low-boiling olefin and more zinc-copper couple in order to destroy the excess of methylene iodine. The additional zinc-copper couple, in an amount of 360 g. (5.0 g.-atom of zinc) was added to the mixture followed by 91.4 g. (0.36 mole) of iodine. After the initial reaction resulting from the addition of the iodine had subsided, 351 g. (5.0 moles) of 2-methylbutene-2 was added as the olefin and the reaction mixture refluxed for an additional 24 hours. At the end of this time, the mixture was cooled and centrifuged to remove the finely-divided metals. The centrifugate obtained was extracted three times with cold 5% hydrochloric acid, three times with 5% sodium bicarbonate solution and 3 times with water. The organic phase obtained was allowed to stand overnight over anhydrous calcium chloride and was then evaporated by a rotary evaporator to remove the solvent. In this evaporation, the pressure was lowered to 27 mm. and the flask was cooled by immersion in ice water. The crude product thus obtained amounted to 200 g. of which approximately 40% was the mono-adduct, tricyclo-[3.2.1.0$^{2,4}$]-oct-6-ene and 40% was the desired di-adduct, tetracyclo-[3.3.1.0.$^{2,4}$0$^{6,8}$]-nonane. This product was purified by first subjecting it to vacuum distillation to obtain a product comprising 86.5% di-adduct. The resulting material was further purified by passing through a vapor phase chromatographic column coated with dinonyl phthalate at a flow rate of 2–1 of nitrogen per minute and a temperature of 140° C. to obtain 30 g. of the tetracyclo-[3.3.1.0.$^{2,4}$0$^{6,8}$]-nonane. This product had a purity of 96.5% as determined by vapor phase chromatography on a Perkin-Elmer model 154C vapor fractometer. The product analyzed 90.0% carbon and 10.0% hydrogen which is the same as the calculated values. The proposed structure for the compound was confirmed by inspection of the infrared spectrum of the product and proof of the absence of double bonds in the product was obtained by the Raman spectrum on a Cary model 81 Rama spectrophotometer.

EXAMPLE 2

In this example, tetracyclo-[3.3.1.0.$^{2,4}$0$^{6,8}$]-nonane was subjected to inspection tests in order to show that the thermal and physical properties of this compound make it suitable for use in the operation of reaction type power plants. The results of these tests are given in Table I.

*Table I*

THERMAL AND PHYSICAL PROPERTIES OF TETRA-CYCLO-[3.3.1.0.$^{2,4}$0$^{6,8}$]-NONANE

| | |
|---|---|
| Hydrogen/carbon ratio | 0.112. |
| Freezing point, ° C | −50.6. |
| Index of refraction, $n_D^{20}$ | 1.5048. |
| Boiling point, ° C | 45–46° C./9.0 mm. |
| Density at 20° C., g./ml | 0.991. |
| Heat of combustion, B.t.u./lb., net | 18,298. |
| Heat of combustion, B.t.u./gal., net | 151,341. |
| Viscosity, cs. at 99° C | 0.90. |
| Thermal decomposition temperature, ° F | 699. |

Heats of combustion were obtained with a Parr oxygen bomb calorimeter on both a weight and a volume basis following the ASTM D–240–57T procedure. The freezing point was determined using the ASTM D–1477–57T procedure. Density was determined at a temperature of 99° C. using a Lipkin bicapillary pycnometer. Viscosity at a temperature of 99° C. was measured using the standard Cannon-Fenske capillary viscosimeter following the ASTM D–445 procedure.

The thermal decomposition temperature was obtained using a high temperature, high pressure isoteniscope which consists of a Monel bomb capped at one end and connected to a precision pressure gauge by a Monel diaphragm. The test fuel was heated within the bomb to an elevated temperature under high pressure and the temperature measured at which the fuel begon to decompose and evolve gas as determined by the changes of pressure within the bomb. In this method, the formation of deposits in the decomposition reaction is not measured because some fuels may start to decompose to gas before forming deposits.

The above examples indicate that tetracyclo-[3.3.1.0.$^{2,4}$0$^{6,8}$]-nonane is very suitable for use in various reaction type power plants. This particular compound has a very high heat of combustion on both a weight basis and a volume basis and therefore can be very advantageously employed in jet-propulsion type engines and turbine type engines where extremely high energy contents are desirable on either a weight basis or a volume basis. Another advantage in using this compound in a reaction type power plant is the fact that this compound has a very low freezing point, and can therefore be satisfactorily handled at low temperatures.

The tetracyclo-[3.3.1.0.$^{2,4}$0$^{6,8}$]-nonane of this invention is also characterized by an unusually high thermal stability when employed as a fuel for a reaction type power plant. This factor is of importance not only in the actual combustion taking place in the engine but also in the fuel system prior to the burning step. For example, it is necessary in high speed aircraft to use a fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the new hydrocarbon fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet and gas turbine engines, the oxidizing agent is air which is compressed either by a mechanical compressor or aerodynamically. Also, in automotive and ship applications, the oxidizing agent will ordinarily be air. In contrast to these applications, the oxidizing agent will usually be liquid oxygen or another chemical oxidizer, for example, fuming nitric acid, hydrogen peroxide, fluorine, or the like in guided missile and rocket applications. In some applications, a mixture of oxidizing agents will also be useful.

The fuel compositions of the present invention may be blended with other materials such as gasoline, kerosene, mixtures of gasoline and kerosene, other aviation fuels, and with the presently available jet fuels to produce an improved fuel composition. More particularly, the fuel described herein may be added to the present aliphatic hydrocarbon fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. When the oxidizing agent is air, the fuel-air ratio will ordinarily be maintained between 0.005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) tetracyclo-[3.3.1.0.$^{2,4}$0$^{6,8}$]-nonane as a new compound, (2) methods for preparing said tetracyclo-[3.3.1.0.$^{2,4}$0$^{6,8}$]-nonane, (3) high energy fuel compositions containing said tetracyclo-[3.3.1.0.$^{2,4}$0$^{6,8}$]-nonane as an essential ingredient, (4) improved methods of developing thrust, and (5) methods of operating reaction type power plants.

I claim:

1. The method of developing thrust in a reaction chamber, said method comprising oxidizing a hydrocarbon fuel composition comprising, as an essential ingredient, tetracyclo-[3.3.1.0.$^{2,4}$0$^{6,8}$]-nonane in said reaction chamber to produce a mass of high temperature gases and exhausting said gases from said reaction chamber so as to develop a high thrust.

2. The method of operating a reaction type power plant, said method comprising injecting a stream of an oxidizing agent and a stream of a hydrocarbon fuel comprising, as an essential ingredient, tetracyclo-[3.3.1.0.$^{2,4}$0$^{6,8}$]-nonane into the combustion chamber of said reaction type power plant, oxidizing said fuel in said combustion chamber, and exhausting the resulting gases from said combustion chamber so as to impart thrust.

3. The method of operating a jet-propulsion engine, said method comprising injecting a stream of an oxidizing agent and a stream of a hydrocarbon fuel comprising, as an essential ingredient, tetracyclo-[3.3.1.0.$^{2,4}$0$^{6,8}$]-nonane into the combustion chamber of said jet-propulsion engine oxidizing said fuel in said combustion chamber, and exhausting the resulting gases in a rearward direction from said combustion chamber so as to impart thrust to said jet propulsion engine.

4. The method of operating a gas turbine engine, said method comprising injecting a stream of an oxidizing agent and a stream of a hydrocarbon fuel comprising, as an essential ingredient, tetracyclo-[3.3.1.0.$^{2,4}$0$^{6,8}$]-nonane into the combustion chamber of said gas turbine engine, oxidizing said fuel, and exhausting the resulting gases from said combustion chamber through a turbine to develop motive power.

5. The method of operating a turbo-jet engine, said method comprising injecting a stream of air and a stream of a hydrocarbon fuel comprising, as an essential ingredient, tetracyclo [3.3.1.0.$^{2,4}$0$^{6,8}$]-nonane into the combustion chamber of said turbo-jet engine, burning said fuel in said combustion chamber, exhausting the resulting gases from said combustion chamber through a turbine to expand the same and compress air supplied to said combustion chamber, and passing the gases into the atmosphere by way of a nozzle to impart thrust to said engine.

6. The method of operating a turbo-jet engine which comprises injecting a stream of air and a stream of tetracyclo-[3.3.1.0.$^{2,4}$0$^{6,8}$]-nonane into the combustion chamber of said engine, effecting combustion in said chamber and exhausting the resulting gases from said combustion chamber through a turbine to expand the same and compress air supplied to said combustion chamber, and passing the gases into the atmosphere by way of a nozzle to impart thrust to said engine.

References Cited in the file of this patent

UNITED STATES PATENTS

| | | |
|---|---|---|
| 2,249,112 | Carmody | July 15, 1941 |
| 2,765,617 | Gluesenkamp et al. | Oct. 9, 1956 |
| 2,766,301 | Büchner et al. | Oct. 9, 1956 |
| 2,826,037 | Scott et al. | Mar. 11, 1958 |

OTHER REFERENCES

Hackh's Chemical Dictionary, 3rd ed. (1950), The Blackiston Co., Philadelphia, pp. 166, 241, 534.